United States Patent [19]
Isobe et al.

[11] Patent Number: 4,610,936
[45] Date of Patent: Sep. 9, 1986

[54] HOT-DIP ZINC ALLOY COATED STEEL PRODUCTS

[75] Inventors: Takehiro Isobe, Bandai; Tatsuji Hashimoto, Aizuwakamatsu, both of Japan

[73] Assignee: Nippon Soda Co., Ltd., Tokyo, Japan

[21] Appl. No.: 672,509

[22] Filed: Nov. 19, 1984

[30] Foreign Application Priority Data

Dec. 12, 1983 [JP] Japan .................. 58-234034

[51] Int. Cl.$^4$ .......................................... B32B 15/01
[52] U.S. Cl. ................................ 428/659; 420/519
[58] Field of Search ................... 420/519; 428/659; 204/44.2; 427/433

[56] References Cited
FOREIGN PATENT DOCUMENTS

| | | |
|---|---|---|
| 50-104731 | 8/1975 | Japan . |
| 54-23032 | 2/1979 | Japan . |
| 0152955 | 11/1981 | Japan .................. 427/433 |
| 58-177446 | 10/1983 | Japan . |
| 0189363 | 11/1983 | Japan .................. 427/433 |

*Primary Examiner*—L. Dewayne Rutledge
*Assistant Examiner*—Robert L. McDowell
*Attorney, Agent, or Firm*—George B. Oujevolk

[57] ABSTRACT

Hot-dip zinc alloy coated steel products coated with a Zn-Al-Si-Mg alloy having a composition of between 3.5 and 5.0 wt % aluminum, between 0.02 and 0.5 wt % silicon, between 0.01 and less than 0.05 wt % magnesium, and remainder zinc with unavoidable impurities.

3 Claims, 6 Drawing Figures

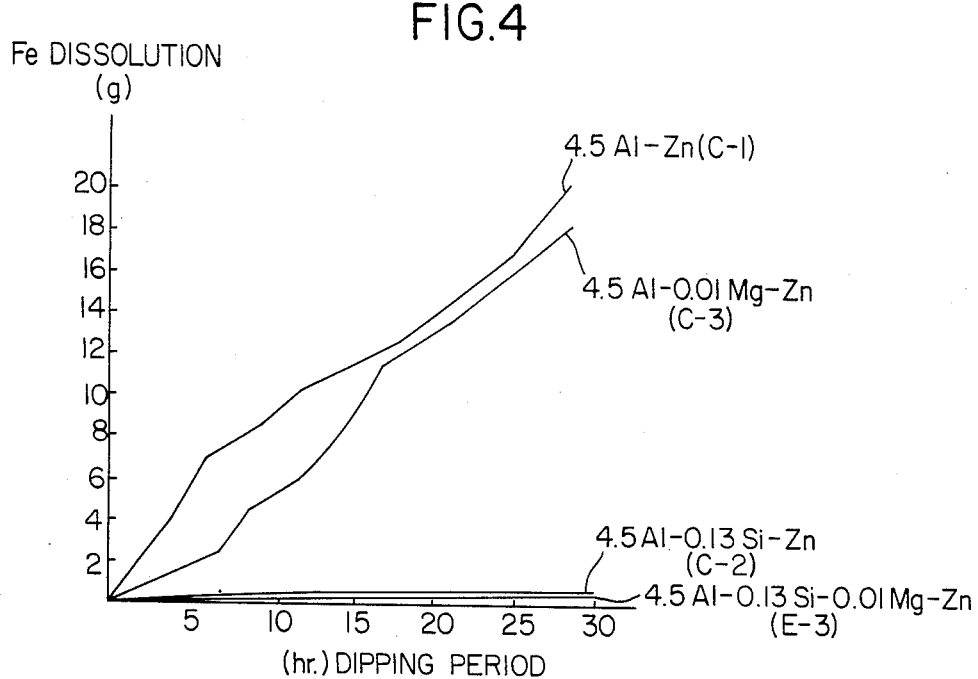
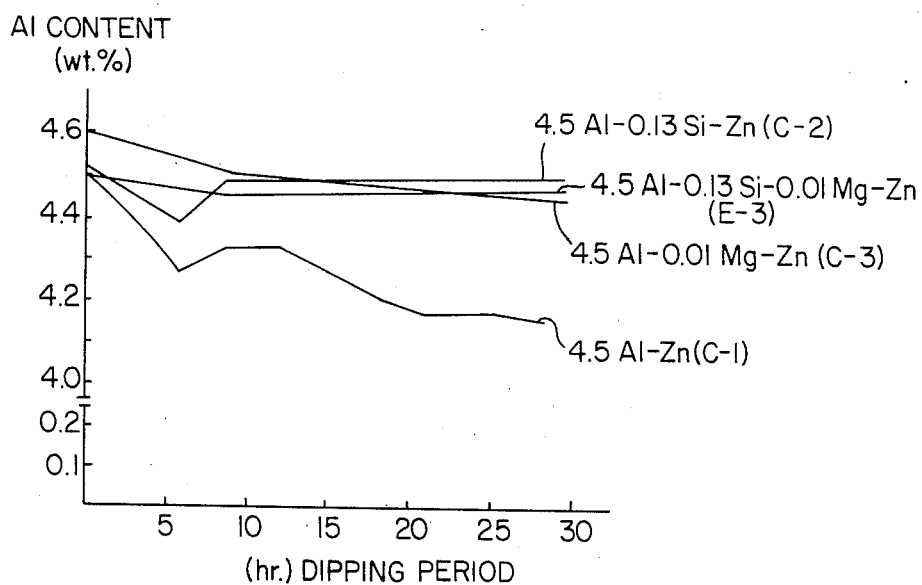

HOT-DIP ZINC ALLOY COATED STEEL PRODUCTS

DETAILED EXPLANATION OF THE INVENTION

BACKGROUND OF THE INVENTION

This invention relates to hot-dip zinc alloy coated steel products having improved resistance to corrosion and good adhesive property of the alloy coatings, to methods of their manufacture and to flux compositions used in the manufacture.

Zinc alloy coatings have long been applied to steel products and compared to electroplating the hot-dip zinc alloy coating can be applied to structurally complicated steel products such as pipes and tubes, section steel, and shaped or contoured parts, such as bolts and nuts, and of course can also be applied to steel sheets and steel wires, etc., at a low cost. For this reason, the use of hot-dipping has become very popular. On comparison with electrogalvanized steel products produced by electroplating, however, hot-dip zinc alloy coated steel products produced by the hot dipping process are found to be inferior in the adhesion of the coating to the steel surface, and for this reason, in workability and further in corrosion resistance.

With the object of improving defects of hot-dip zinc alloy coated steel products, and of improving the corrosion resistance of the coatings, in particular, many propsals have been made on hot-dip zinc alloy coated steel products.

In the Japanese Patent Publication (before examination) No. Tokkaisho 50-104731 (1975), a Zn-Al-Si alloy for hot-dip coating having a composition of 5–20 wt% aluminium (Al), less than 5 wt% silicon (Si) and remainder zinc (Zn) is proposed and in the Japanese Patent Publication (before examination) No. Tokkaisho 54-23032 (1979), a Zn-Al-Si-Sn alloy for hot-dip coating having a composition of 2–20 wt% Al, 0.001–0.5 wt% Si, 0.01–0.1 wt% Sn and remainder Zn is proposed. In both of these coatings, however, highly Al rich bata ($\beta$) phase precipitates as primary crystals in the alloy coating and in regions where the Al content exceeds 5 wt% the corrosion resistance deteriorates. In particular, in the case of the latter proposal, in regions where the Al level falls below 5 wt%, the coating shows remarkably favorable corrosion weight loss in a salt water spray test, but by the influence of added Sn, intercrystalline corrosion appears and further adhesion between the coating and the steel product is inferior and the coating peels off by 2T bending test and tape test and consequently, the workability is bad.

The Japanese Patent Publication (before examination) No. Tokkaisho 58-177446 (1983) discloses alloy coated steel sheets having good corrosion resistance and paintability and the coating consists of 3–40 wt% Al, 0.05–2.0 wt% Mg, 0.015–4.0 wt% Si (0.005–0.1 times of Al content), less than 0.02 wt% lead (Pb) and the remainder Zn. Even in this method, in the range where Al content exceeds 5 wt%, corrosion resistance deteriorates because Al—rich and grown beta-phase precipitates as primary crystals. On the other hand when Al content falls below 5 wt%, corrosion weight loss becomes very small in a salt water spray test, however, intercrystalline corrosion occurs since Mg in the alloy coating exceed the solubility limit in solid solution and this Mg serves to cause intercrystalline corrosion, rather than prevent it to meet the purpose for which it is normally added.

On the other hand, there are dry methods and wet method for production of hot-dip alloy coated steel by using a molten bath of zinc alloy. In dry method, non-annealed steel products have their surfaces chemically reduced by hydrogen and ammonia, etc., at a high-temperature in a furnace, and are then dipped in a coating bath at controlled temperature. In the wet method, annealed steel products are degreased by alkali, acid-pickled, rinsed with water sufficiently, and fluxed and then they are dipped in a coating bath. For fluxing, the steel products are ordinally dipped in water solution of flux composition and dried to form the film of flux composition on the steel surface and then the steel product with thin film is dipped in coating bath. In the coating bath, flux composition melts and removes from the surface of steel products to expose the surface to and contact with melted zinc alloy. The dry method is an excellent method if the coating process is connected with steelmaking and rolling sectors, but its application is difficult when coating is applied for steel pipes and tubes, section steel and shaped or contoured steel parts, etc. The wet method can be used either with steel sheets, steel wires, steel pipe and tubes, section steel and shaped or contoured steel part. In the wet method, however, it is difficult to maintain the steel surface in a stable condition as in the dry method, and as a result, alloy coatings have defects such as un-coating. In order to prevent the defect of un-coating, fluxing is performed before coating, but the fluxes generally used, such as ammonium chloride ($NH_4Cl$) and ammonium zinc chloride ($ZnCl_2.3NH_4Cl$) can be used for hot-dip zinc alloys of any compositions. However, when $ZnCl_2.3NH_4Cl$ is used for Zn-Al alloy coating, un-coating can not be avoidable.

SUMMARY OF THE INVENTION

It is an object of this invention to provide hot-dip zinc alloy coated steel products having an excellent corrosion resistance.

Another object of this invention is to provide hot-dip zinc alloy coated steel products having excellent resistance to intercrystalline corrosion.

Another object of this invention is to provide hot-dip zinc alloy coated steel covered with coating having excellent adhesion property to steel products.

Another object of this invention is to provide flux compositions suitable for hot-dip zinc alloy coating of steel products.

These objects, features and advantages of this invention will become more apparent in the detailed description and examples which follow.

FIGS. 1(a), (b) and (c) show vertical sectional views of electron microscopic observation at 2,200×, 2,000× and 1,700× of magnification, respectively, of the microstructures of alloy coatings.

FIG. 4 shows the relation between the dipping period (hr: abscissa) for which the steel product was dipped in the coating bath and the quantity of Fe dissolution (g: ordinate) in the bath.

FIG. 5 shows the relation between dipping period (hr: abscissa) of the steel product in the coating bath and Al content (wt%: ordinate) of the bath.

This invention is a novel hot-dip zinc alloy coated steel product coated with a Zn-Al-Si-Mg alloy having a composition of between 3.5 and 5.0 wt% Al, between 0.02 and 0.5 wt% Si, between 0.01 and less than 0.05 wt% Mg, and remainder Zn with unavoidable impurities between 0.01 and 0.04%.

Figure 1A:
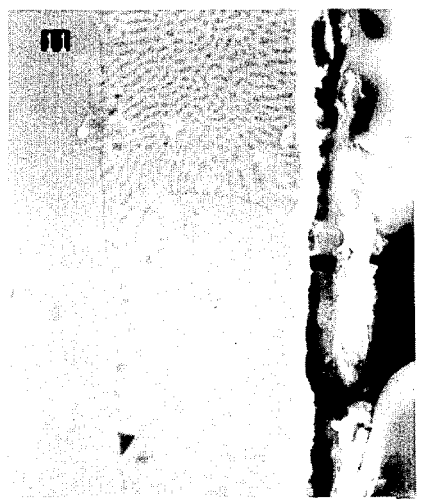

In this invention, the alloy coating made on steel consists of Zn-rich alpha (α) phase and alpha+beta eutectic phase, as shown in the photograph of electron microscope in FIG. 1(a) attached hereto and sometimes has Si-rich 3rd phase but does not have Fe-Zn alloy layers which are ordinarily formed in hot-dip zinc alloy coatings.

Alpha phase consists of 0.05–1.0 wt% Al, 0.03–0.08 wt% Si, 0.01–0.05 wt% Mg and remainder Zn with unavoidable impurities and alpha+beta eutectic phase consists of 3.1–4.2 wt% Al, 0.02–0.07 wt% Si, 0.01–0.08 wt% Mg and remaining Zn with unavoidable impurities. The ratio of alpha phase eutectic phase may increase to at most 37.5%, alpha+beta eutectic phase may decrease to at least 62.5%. Si-rich 3rd phase having an area share of 0–0.4% occasionally occurs, as far as, the average compositions of the coating are 3.5–5.0 wt% Al, 0.02–0.5 wt% Si, 0.01—less than 0.05 wt% Mg and remaining Zn with a slight amount, namely 0–0.02 wt% at most, of unavoidable impurities. Both alpha phase and alpha+beta eutectic phase characteristically contain Mg in them in solid solution, below a solution limit of 0.05 wt% and 0.08 wt%, respectively.

Hot-dip zinc alloy coated steel products in this invention include steel sheets, steel pipes and tubes, steel wires, section steel and shaped or contoured steel parts, such as bolts and nuts and all of them are coated with above described alloy. The coating in this invention can be performed by dipping the steel products in a coating bath held at 450°–480° C., preferably at 460°–480° C. and consisting essentially of the same average composition of which the aforesaid alloy coating is formed, after this, pulling them up from the bath and allowing them to stand to cool in the atmosphere or being rapidly cooled.

In fluxing, for the coating in this invention, a water solution of 200–300 g/liter-water of fluxing compositions, the fluxing composition consisting of 0.5–8.0 wt% SnCl$_2$, 0.5–8.0 wt% acid fluorides, such as NH$_4$HF$_2$, NaHF$_2$ and KHF$_2$, 5–30 wt% alkali chlorides, such as NaCl and KCl, and remainder ZnCl$_2$ is preferably used to enable a superb alloy coating.

In this invention, the alloy coating has markedly improved corrosion resistance as expressed in terms of corrosion weight loss under a salt water spray test and can completely inhibit intercrystalline corrosion. As shown in FIG. 1(a), the alloy coating has no Fe-Zn alloy layer at all, however, as shown in the tape test in Table 3, it has excellent adherence properties with steel.

Figure 2:
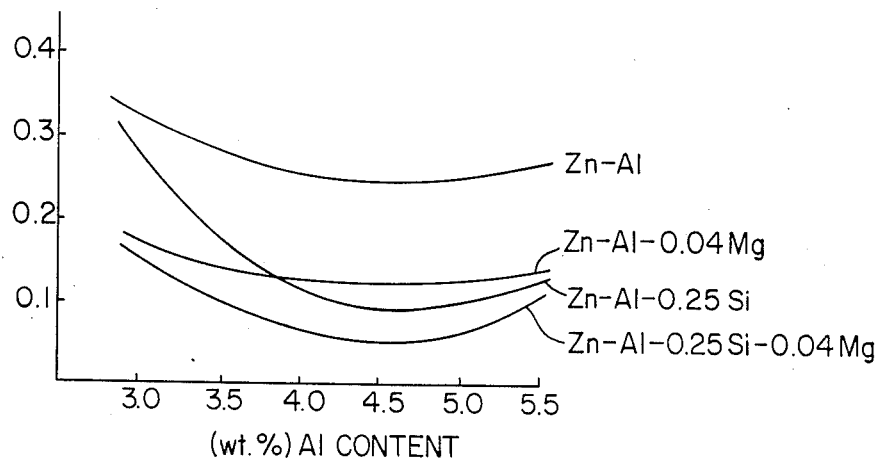
FIG. 2 shows curves describing between the average corrosion weight loss per unit period of time (g/m² hr: ordinate) and Al content in coating (wt%: abscissa).

When the Al content in the average compositions of the alloy coating exceeds 5 wt%, Al-rich beta phase precipitates as primary crystals to cause a drop in corrosion resistance and adhesive property. As shown in FIG. 2, at a range of 3.5–5.0 wt% Al the corrosion resistance as expressed by corrosion weight loss under a salt water spray test reaches the lowest level and in light of this, a range of Al composition is selected at 3.5–5.0 wt%.

It is known that Si acts to improve the workability of hot-dip zinc alloy coated steel products. However, in this invention, as shown in FIG. 2 Si also contributes to improve corrosion resistance. The upper limit of Si content is decided at 0.5 wt% from a view point that Si precipitates at 5 wt% Al as primary crystals to cause a drop in corrosion resistance and the lower limit of Si is 0.02 wt% from a view point that less than 0.002 wt% Si can not improve corrosion resistance. In cases that Al content falls below 5 wt%, any amount of Si in excess of the solid solubility limit in solid solution precipitates as Si-rich 3rd phase, but how this affects corrosion resistivity is yet to be clarified.

Figure 1B:
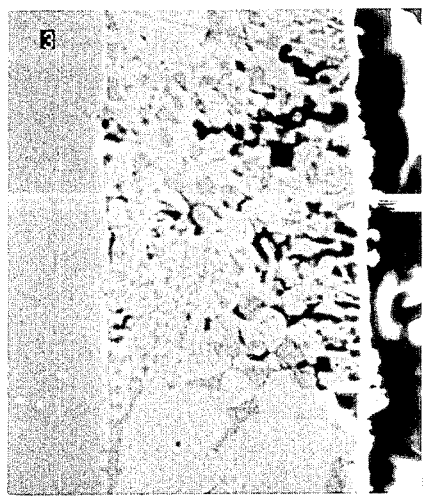

It is known that Mg is added to improve intercrystalline corrosion, however, in this invention, Mg contributes to improve corrosion resistance for salt water spray test as shown in FIG. 2. Mg shows an effect to restrain intercrystalline corrosion to the extent that Mg in coatings completely dissolves in alpha phase and alpha+beta phase as a solid solution, however, when Mg exceeds solubility limit, Mg promotes intercrystalline corrosion as shown in FIG. 1(b). At 0.05 wt% or more Mg, especially 0.06 wt% Mg, Mg is concentrated around alpha phase granules, and less than 0.05 wt% Mg restrains intercrystalline corrosion. The upper off limit of Mg content, therefore, is 0.05 wt%, and the upper boundary becomes less than 0.05 wt%. For the sake of allowance in solubility and the efficacy of Mg component, for example, 0.04 wt% is the preferable concentration of Mg. The lower limit of Mg should desirably be set at no less than 0.01 wt% at the least, though this differs with the level of unavoidable impurities, such as lead, copper and tin, which cause intercrystalline corrosion in coatings.

In this invention, the wet method does not limit the shape of the steel materials to be coated and keeps plant cost and coating cost down.

The composition of the coating bath used for manufacturing coated steel products in the invention is almost free from changes of composition according to time lapse and is therefore stable as shown in FIG. 5. In other words, the same composition of alloy coating as that of the coating bath can be stably obtained.

Figure 6:
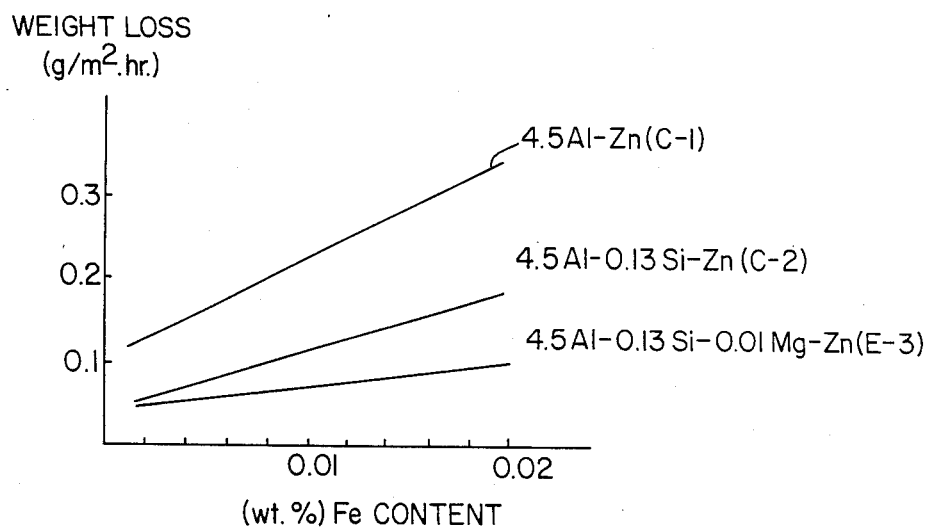
FIG. 6 shows the relation between Fe content (wt%: abscissa) of the coating bath and the corrosion weight loss (g/m$^2$ hr: ordinate) of the coating by salt water spray test.

Furthermore, as shown in FIG. 4, Fe dissolution into the bath is virtually absent, and as shown in FIG. 6 Fe content, as unavoidable impurities, of the coating bath, exerts a large effect on the corrosion weight loss in a salt water spray test. For this reason, the content of Fe in a coating bath should desirably be held below 0.02 wt%. As described before, the absence of Fe dissolution into the coating bath and that of changes of composition of the coating bath make the control of the coating bath exceedingly easy and also alloy coating with excellent corrosion resistance can be stably obtained.

Depending on the coating bath composition, at a coating bath temperature lower than 450° C., the fluidity of the bath becomes too small and formation of a smooth coating surface becomes difficult, and at higher than 490° C. of the coating bath temperature, Fe dissolution into the bath becomes too large, and consequently, the coating bath temperature should be kept 450°–480° C., and desirably, 460°–480° C.

The conditions under which alloy coated steel products are cooled after pulling out from the coating bath, exert influence on the microstructure of the coating.

Heat treatment after pulling out from the coating bath deteriorates corrosion resistance because alpha+beta eutectic phase, in particular, beta phase in the coating, develops too large coarse particles. Further, the distribution of Mg in solid solution changes and the inhibitory effect of Mg on intercrystalline corrosion decreases. Worse still, brittle Fe-Zn alloy phase appears in the coating and the workability of the coated steel products deteriorates. For these reasons, cooling conditions of standing to cool in the atmosphere or rapid cooling are preferred for this invention.

In the wet method it is well known that the fluxing removes oxides from the steel surface, improves wetting property between the steel product and hot-dip alloy and activates the steel surface to form a highly adhesive coating. Accordingly, fluxes are required to act as detergent and as activator in relation to the steel surfaces. Simultaneously, the fluxes are required to form a suitable thin film on the surfaces of the steel surface prior to their hot-dipping, said thin film, upon being dipped in the coating bath, are required to readily liberate itself from the steel surface to expose the cleaned and activated steel surfaces directly to the coating bath. Fluxes are also required not to contaminate the coating bath when they dissolve in the hot bath. If they are able to perform any and all of these actions, any fluxing composition may be employed and the new fluxing compositions described herein is preferably used for the coating in this invention.

In the new fluxing composition, $SnCl_2$ is used as the major ingredient. $SnCl_2$ has an exceedingly strong surface activating action. It functions to increase the affinity between steel and the molten zinc alloy and improves adhesive strength of the coating. $SnCl_2$, however, easily hydrolyzes in the water solution. Acid fluorides such as $NH_4HF_2$, $NaHF_2$ and $KHF_2$ are employed to prevent hydrolysis of $SnCl_2$ in the water solution, and further they possess marvelous fluxing activity. $ZnCl_2$ is known as an important fluxing element and in fact possesses fluxing activity. In this invention, it is an indispensable element to lower the melting point of a fluxing composition and make films of flux composition on steel surface easy to expose the surface in molten zinc alloy in the bath. An alkali chloride, such as NaCl and KCl, does not exhibit fluxing actions, but when added in a molecular ratio close to the one in which $ZnCl_2$ is mixed to form an eutectic mixture, then such as alkali chloride further lowers the melting point of the flux and promotes the fluxing activity of other fluxing elements.

For the flux compositions, a content of $SnCl_2$ less than 0.5 wt% provides only insufficient surface activity and when it exceeds 8 wt%, the prevention of hydrolysis of $SnCl_2$ in the water solution is undesirably rendered difficult. Therefore, the content of $SnCl_2$ should be 0.5-8.0 wt%, and for economic considerations, should desirably be 1-5 wt%.

The minimum amount of an acid fluoride needed to prevent hydrolysis of $SnCl_2$ is equivalent to the amount of the $SnCl_2$. Accordingly, the compositional range of acid fluorides is 0.5-8.0 wt%. In excess of 8.0 wt%, acid fluorides undesirably cause precipitate of zinc fluoride in the water solution.

Alkali chloride, below 5 wt% insufficiently lowers the melting point of the flux, and in excess of 30 wt%, it raises the melting point of the flux. Thus, the alkali chloride must compositionally be 5-30 wt%, or more desirably, 10-20 wt%. Though it depends on the composition of other ingredients, $ZnCl_2$ must equal or exceed 50 wt% to obtain desired effect.

The fluxing composition in this invention is used as a water solution of 200-300 g/liter and the water solution is an acid aqueous solution having a pH value of 4.0-4.5 and its corrosivity to iron is excessively small at 0.003-0.004 $g/m^2$ hr. Accordingly, the dissolution of iron ions into said water solution is so small that it becomes possible to control contents of flux composition in a water solution by measuring the specific gravity of the solution. To flux steel products, steel products are degreased, pickled and water-washed as usual and then are dipped in a water solution of flux composition for 30-60 seconds and dried up.

Then the steel products adhering flux on the steel surface are dipped in coating bath and flux on the surface swiftly melts, floats and partly evaporates at the bath surface.

Fluorine in the flux compositions added as acid fluoride reacts with Zn and Al, etc., and remains on the bath surface in the form of $ZnF_2$, $AlF_2$ or other stable compounds. Generation of hydrogen fluoride gas and other vapor that become sources of environmental pollution are negligibly of small amount.

The fluxing compositions of this invention not only can be used for the hot-dip zinc alloy coated steel products of this invention also show their excellent performance in fluxing operation of wet method for conventional hot-dip zinc alloy coated steel products.

To further illustrate this invention following examples and tests are given, but this invention is not limitted by those.

EXAMPLES

Alloys, zinc base alloys, were separately fused in graphite crucibles set in a small electric furnace, and thus coating baths were prepared. Table 1 shows the coating bath compositions used.

0.3 mm thick cold-rolled steel sheets were degreased by a water solution of 6 wt% caustic soda and were rinsed with water. After this, the sheets were pickled in 8 wt% hydrochloric acid solution and were then rinsed with water. The steel sheets were next dipped for 60 seconds in a water solution of the fluxing composition as shown in Table 2. After this fluxing operation, the sheets were held at a temperature of 200° C. for drying. As comparative examples of the flux, as shown as Symbol F-7 in Table 2, a conventionally used water solution of $ZnCl_2.3NH_4Cl$ was employed.

The fluxed steel sheets were then dipped for 10 seconds in a variety of coating baths mentioned above respectively. The products were then pulled up from the bath as hot-dip zinc alloy coated steel sheets.

The section of the hot-dip zinc alloy coated sheet obtained was then examined by EPMA (made by Electron Probe Micro Analyzer of Hitachi, Ltd.: 650×) to analyze the alloy coating for microstructure and for composition. The hot-dip zinc alloy coated steel obtained was also measured for the coating weight of alloy by using the antimony chloride method (JIS-(Japanese Industrial Standard)-HO401).

Table 1 shows fluxing conditions, coating bath temperatures, cooling conditions after coating, coating weight of alloy, and the result of the analysis of the alloy coating in addition to coating bath compositions.

Test

The hot-dip zinc alloy coating steel products obtained were put to the following tests.

(1) Salt water spray test

A salt water spray test, in which 5% of salt water was sprayed at 35° C. and 95% of relative humidity, was conducted in accordance with JIS(Japanese Industrial Standard)-Z 2371. Table 3 shows the average corrosion weight loss per unit period of time and 5% red rust generation time of the coating subjected to this test.

Figure 1C:

FIG. 1 shows the state of intercrystalline corrosion of alloy coating after 900 hours of salt water spray test. FIG. 1(a) shows coating of this invention (E-1) and from the photegraph, it became obvious that intercrystalline corrosion did not occur. FIG. 1(b) shows coating of comparative example (C-4) and FIG. 1(c) shows coating of comparative example (C-5) and those two show that intercrystalline corrosion considerably progressed.

FIG. 2 shows relation between the average corrosion weight loss per unit period of time and Al content in coating at 72 hours salt water spray test. FIG. 2 shows that addition of Si and further addition of Mg improve corrosion resistance.

Figure 3:
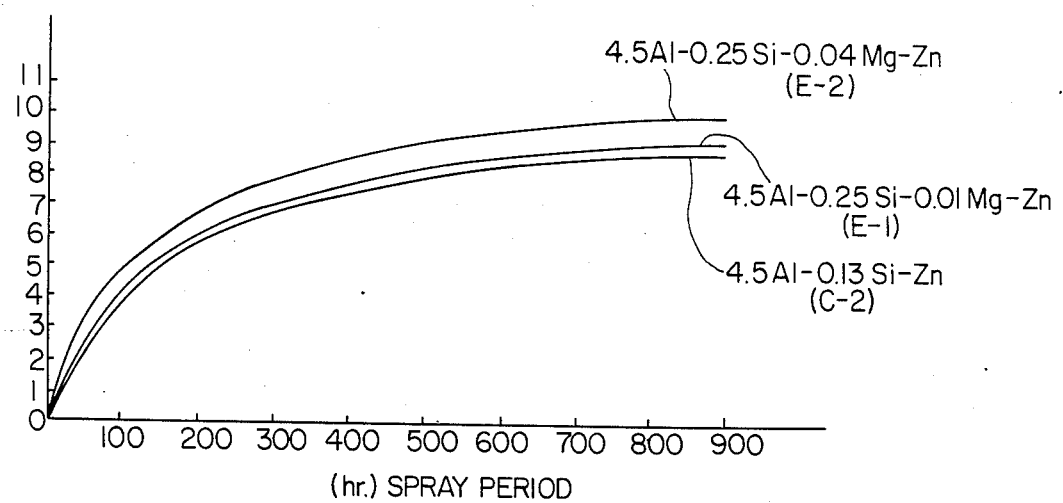
FIG. 3 shows the relation between corrosion weight loss (g/m²: ordinate) and the salt water spray test period (hr: abscissa).

FIG. 3 shows the relation between corrosion weight loss and the salt water spray test period and shows that coating (E-1 and E-2) of this invention and comparative example (C-2) are excellent in weight loss. However comparative example (C-2) has inferior corrosion resistance because it rusts at 1,200 hour spray of salt water (see table 3).

(2) Steam test

The alloy coated steels were exposed for three days in a saturated steam at 98° C. and, soon after this, were subjected to 2T bending test and their appearance was observed. And then tape test were carried out. Table 3 shows the results.

2T bending test: Coated sheet is folded twice at a curvature of two times thickness of the sheet and appearance of cracks on coating of bended part is observed.

Tape test: After 2T bending test, adhesive tape is put on the coating of the bended part, the tape is repidly peeled off and peeling of the coating is observed.

(3) Fe dissolution test

The same fluxed steel products having 30 cm$^2$ of surface as used in the examples and in the comparative examples were dipped for an extended period of time in 1.4 liter of the coating bath. After this, the coating bath was checked for Fe dissolution, and for a change in Al content. The hot-dip zinc alloy coated steel products thus obtained after a long period of dipping were then carried out salt water spray test. The results were shown in FIGS. 4, 5 and 6.

TABLE 1

| | No. | Fluxing Composition*1 | Fluxing Concentration (g/l) | Coating bath composition (wt %) Al | Si | Mg | Sn | Pb | Fe | Zn | Bath temperature (°C.) | Cooling conditions | Alloy coating weight (g/m²) | Alloy coating composition (wt %) Al | Si | Mg | Sn | Pb | Fe | Zn | Note |
|---|---|---|---|---|---|---|---|---|---|---|---|---|---|---|---|---|---|---|---|---|---|
| Examples of this invention | E-1 | F-3 | 300 | 4.5 | 0.25 | 0.01 | — | — | — | Remaining | 480 | Cooling at atmosphere | 96 | 4.5 | 0.23 | 0.01 | — | — | — | Remaining | *In E-5 and E-6 Si-rich 3rd phases are found in addition to α phases and α + β phases. *Solute Si is present within phases at a content of about 0.07%. Mg is almost evenly distributed in α phases and α + β phases. |
| | E-2 | F-3 | 200 | 4.5 | 0.25 | 0.04 | — | — | — | Remaining | 480 | Cooling at atmosphere | 98 | 4.5 | 0.24 | 0.04 | — | — | — | Remaining | |
| | E-3 | F-4 | 250 | 4.5 | 0.13 | 0.01 | — | — | — | Remaining | 480 | Rapid Cooling | 292 | 4.5 | 0.13 | 0.01 | — | — | — | Remaining | |
| | E-4 | F-5 | 200 | 4.5 | 0.13 | 0.04 | — | — | — | Remaining | 480 | Rapid cooling | 272 | 4.5 | 0.13 | 0.04 | — | — | — | Remaining | |
| | E-5 | F-1 | 300 | 3.5 | 0.25 | 0.01 | — | — | — | Remaining | 460 | Cooling at atmosphere | 146 | 3.5 | 0.24 | 0.01 | — | — | — | Remaining | |
| | E-6 | F-2 | 300 | 3.5 | 0.25 | 0.04 | — | — | — | Remaining | 460 | Rapid cooling | 152 | 3.5 | 0.24 | 0.04 | — | — | — | Remaining | |
| | E-7 | F-6 | 200 | 4.5 | 0.25 | 0.04 | — | — | 0.02 | Remaining | 480 | Cooling at atmosphere | 188 | 4.5 | 0.25 | 0.04 | — | — | 0.015 | Remaining | |
| | E-8 | F-3 | 250 | 3.5 | 0.13 | 0.01 | — | — | 0.01 | Remaining | 460 | Cooling at atmosphere | 246 | 3.5 | 0.13 | 0.01 | — | — | 0.01 | Remaining | |
| Comparatives | C-1 | F-3 | 300 | 4.5 | — | — | — | — | — | Remaining | 480 | Cooling at atmosphere | 208 | 4.5 | — | — | — | — | 0.02 | Remaining | |
| | C-2 | F-3 | 300 | 4.5 | 0.13 | — | — | — | — | Remaining | 480 | Cooling at atmosphere | 234 | 4.5 | 0.13 | — | — | — | 0.005 | Remaining | |
| | C-3 | F-3 | 300 | 4.5 | — | 0.04 | — | — | — | Remaining | 480 | Cooling at atmosphere | 260 | 4.5 | — | 0.04 | — | — | 0.005 | Remaining | |
| | C-4 | F-3 | 300 | 4.5 | 0.13 | 0.10 | — | — | — | Remaining | 480 | Cooling at atmosphere | 220 | 4.5 | 0.13 | 0.10 | — | — | — | Remaining | |
| | C-5 | F-3 | 300 | 4.5 | 0.13 | — | 0.1 | — | — | Remaining | 480 | Cooling at atmosphere | 261 | 4.5 | 0.13 | — | 0.1 | — | 0.01 | Remaining | Sn is not find within phases. |
| | C-6 | F-3 | 300 | 0.15 | — | 0.5 | — | 0.03 | 0.02 | Remaining | 520 | Cooling at atmosphere | 98 | 0.15 | — | 0.5 | — | 0.03 | 0.05 | Remaining | |
| *2 C-7 | F-7 | 300 | 4.5 | 0.25 | 0.04 | — | — | — | Remaining | 480 | Cooling at atmosphere | — | — | — | — | — | — | — | — | Coating fails to form and alloy coating can not be made. |
| *2 C-8 | F-7 | 300 | 3.5 | 0.13 | 0.01 | — | — | — | Remaining | 460 | Cooling at atmosphere | — | — | — | — | — | — | — | — | |

*1 Compositions are denoted in symbols of fluxing composition shown in Table 2
*2 Comparative examples of both fluxing compositions C-7 and C-8

TABLE 2

| Symbol | SnCl$_2$ | Acid fluorides | | | Alkali chlorides | | ZnCl$_2$ |
| --- | --- | --- | --- | --- | --- | --- | --- |
| | | NH$_4$HF$_2$ | NaHF$_2$ | KHF$_2$ | NaCl | KCl$_2$ | |
| F-1 | 0.5 | 0.5 | — | — | 20 | — | 79 |
| F-2 | 1.0 | 1.0 | — | — | 10 | — | 88 |
| F-3 | 2.0 | 2.0 | — | — | 10 | — | 86 |
| F-4 | 2.0 | 2.0 | — | — | — | 30 | 66 |
| F-5 | 4.0 | — | 4.0 | — | — | 10 | 82 |
| F-6 | 6.0 | — | — | 6.0 | 10 | — | 78 |
| F-7 | Goods on the market: ZnCl$_2$·3NH$_4$Cl | | | | | | | unit: wt %

TABLE 3

| No. | Sample No.* | Salt water spray test | | | | | | Steam test | |
| --- | --- | --- | --- | --- | --- | --- | --- | --- | --- |
| | | Corrosion weight loss (g/cm$^2$ hr) | | | | 5% red rust generation time (hr) | Appearance | 2T bending test | Tape test |
| | | 72 hrs | 240 hrs | 480 hrs | 900 hrs | | | | |
| 1 | E-1 | 0.05 | 0.027 | 0.017 | 0.010 | more than 4000 | Good*** | No cracks | No peeling |
| 2 | E-2 | 0.04 | 0.025 | 0.016 | 0.010 | more than 4000 | Good | No cracks | No peeling |
| 3 | E-3 | 0.07 | —** | — | — | more than 4000 | Good | No cracks | No peeling |
| 4 | E-4 | 0.06 | — | — | — | more than 4000 | Good | No cracks | No peeling |
| 5 | E-5 | 0.08 | — | — | — | more than 4000 | Good | No cracks | No peeling |
| 6 | E-6 | 0.07 | — | — | — | more than 4000 | Good | No cracks | No peeling |
| 7 | E-7 | 0.05 | — | — | — | more than 4000 | Good | No cracks | No peeling |
| 8 | E-8 | 0.09 | — | — | — | more than 4000 | Good | No cracks | No peeling |
| 9 | C-1 | 0.24 | — | — | — | less than 500 | Fair**** | Partial cracking | All peeled off |
| 10 | C-2 | 0.06 | 0.029 | 0.019 | 0.011 | less than 1200 | Fair | No cracks | Partially peeled |
| 11 | C-3 | 0.12 | 0.040 | 0.028 | — | less than 900 | Fair | Partical cracking | All peeled off |
| 12 | C-4 | 0.06 | 0.030 | 0.021 | — | less than 900 | Good | No cracks | Partially peeled |
| 13 | C-5 | 0.09 | 0.066 | — | — | less than 480 | Good | General cracking | All peeled off |
| 14 | C-6 | 0.5 | 0.300 | 0.170 | — | less than 250 | Fair | Partical cracking | All peeled off |

*The sample numbers represent the numbers of working examples and of comparative examples given in Table 1.
**The empty spaces in the table signify that measurements have not been taken.
***"Good" means that appearance of coating surface is almost unchanged.
****"Fair" means that no spangle appears of the coating surface.

We claim:

1. A zinc alloy coated steel product coated with a Zn-Al-Si-Mg alloy having a composition consisting of between 3.5 and 5.0 wt% aluminum, between 0.02 and 0.5 wt% silicon, between 0.01 and less than 0.05 wt% magnesium and remainder zinc and unavoidable impurities, said product being capable of withstanding, after exposure to saturated steam for three days at 98° C., a 2T bending test without cracking and a tape test without peeling.

2. The zinc alloy coated steel product of claim 1, wherein said composition contains between 0.01 and 0.04 wt% magnesium.

3. The zinc alloy coated steel product of claim 1, wherein said composition contains less than 0.02 wt% iron as an unavoidable impurity.

* * * * *